US012072291B2

(12) United States Patent
Sturm

(10) Patent No.: US 12,072,291 B2
(45) Date of Patent: Aug. 27, 2024

(54) APPARATUS AND METHOD FOR ELEMENT ANALYSIS OF MATERIALS BY MEANS OF OPTICAL EMISSION SPECTROSCOPY

(71) Applicant: Fraunhofer-Gesellschaft zur Förderung der angewandten Forschung E.V., Munich (DE)

(72) Inventor: Volker Sturm, Aachen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 298 days.

(21) Appl. No.: 17/292,985

(22) PCT Filed: Nov. 14, 2019

(86) PCT No.: PCT/EP2019/081335
§ 371 (c)(1),
(2) Date: May 11, 2021

(87) PCT Pub. No.: WO2020/099569
PCT Pub. Date: May 22, 2020

(65) Prior Publication Data
US 2021/0396679 A1    Dec. 23, 2021

(30) Foreign Application Priority Data
Nov. 15, 2018    (DE) .................... 10 2018 128 754.2

(51) Int. Cl.
*G01N 21/71* (2006.01)
*G01J 3/443* (2006.01)
(Continued)

(52) U.S. Cl.
CPC ............ *G01N 21/718* (2013.01); *G01J 3/443* (2013.01); *G01N 21/15* (2013.01); *G01N 21/33* (2013.01);
(Continued)

(58) Field of Classification Search
CPC ...... G01N 21/718; G01N 21/15; G01N 21/33; G01N 2021/151; G01N 2021/335; G01J 3/443
See application file for complete search history.

(56) References Cited

U.S. PATENT DOCUMENTS 4,645,342 A * 2/1987 Tanimoto ............. G01N 21/718
356/318
6,400,787 B2 * 6/2002 Niemax ............... G01N 21/718
250/493.1
(Continued)

FOREIGN PATENT DOCUMENTS

DE    4443407 A1    6/1995
DE    4443407 C2 *  7/1999 ............ G01N 21/718

OTHER PUBLICATIONS

International Search Report for Patent Application No. PCT/EP2019/081335, dated Jan. 8, 2020, European Patent Office, Rijswijk, Netherlands, pp. 1-6.
(Continued)

*Primary Examiner* — Jamil Ahmed
(74) *Attorney, Agent, or Firm* — Crowell & Moring LLP

(57) ABSTRACT

A device may be provided for element analysis of materials by means of optical emission spectroscopy, particularly by means of laser-induced plasma spectroscopy, said device having: means for exciting a plasma from a partial quantity of a test sample made of the material to be analyzed; means for detecting and for spectral analysis of optical radiation emitted from the plasma; beam guidance means for guiding at least a part of the optical radiation emitted from the plasma to the means for detecting and spectral analysis; and means for flushing at least one partial region of the device with an inert gas, wherein the beam guidance means are at least one capillary tube, which additionally serves to guide (Continued)

the inert gas. A method may be provided for element analysis of materials by means of optical emission spectroscopy using the device.

19 Claims, 12 Drawing Sheets

(51) Int. Cl.
　　　G01N 21/15　　　(2006.01)
　　　G01N 21/33　　　(2006.01)
(52) U.S. Cl.
　　　CPC . *G01N 2021/151* (2013.01); *G01N 2021/335* (2013.01)

(56) References Cited

U.S. PATENT DOCUMENTS

| | | | |
|---|---|---|---|
| 2003/0122064 A1* | 7/2003 | Tanaka | G02B 6/32 250/227.11 |
| 2003/0174325 A1* | 9/2003 | Zhang | G01N 21/718 356/318 |
| 2010/0208256 A1* | 8/2010 | Tang | G01N 21/255 356/326 |
| 2015/0103334 A1* | 4/2015 | Quant | G01J 3/0221 356/51 |
| 2019/0261897 A1* | 8/2019 | Kersey | A61B 5/14546 |

OTHER PUBLICATIONS

Balzer, Herbert et al., "New approach to online monitoring of the Al depth profile of the hot-dip galvanized sheet steel using LIBS", *Anal Bioanal Chem*, 2006, pp. 1-8.

Day, D. et al., "A Full featured handheld LIBS analyzer with early results for defense and security", *Proc. of SPIE*, vol. 9842, 2015, pp. 1-7.

Strum, V. et al, "Steel Analysis with Laser-Induced Breakdown Spectrometry in the Vacuum Ultraviolet", *Applied Spectroscopyy*, vol. 54, No. 9, 2000, pp. 1275-1278.

Yamamot, Karen Y. et al., "Detection of Metals in the Enviroment using a Portable Laser-Induced Breakdown Spectroscopy Instrument", *Applied Spectroscopy*, vol. 50, No. 2, 1996, pp. 222-233.

* cited by examiner

APPARATUS AND METHOD FOR ELEMENT ANALYSIS OF MATERIALS BY MEANS OF OPTICAL EMISSION SPECTROSCOPY

CROSS-REFERENCE TO RELATED APPLICATIONS

This application is a 371 nationalization of international patent application PCT/EP2019/081335 filed Nov. 14, 2019, which claims priority under 35 USC § 119 to German patent application DE 10 2018 128 754.2 filed Nov. 15, 2018. The entire contents of each of the above-identified applications are hereby incorporated by reference.

DETAILED DESCRIPTION

Figure 1:
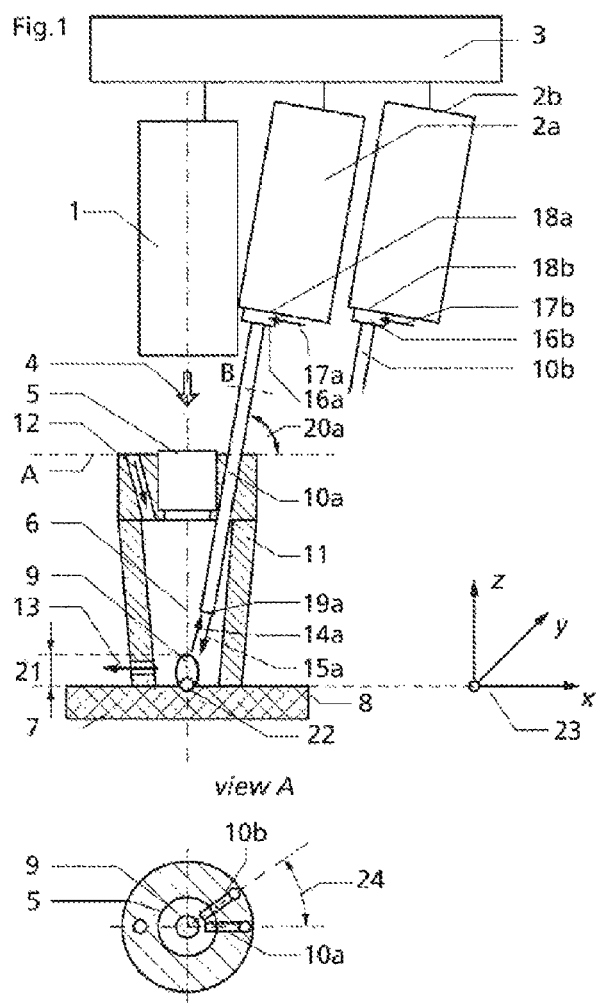
FIG. 1 is an apparatus according to an exemplary embodiment of the invention in a longitudinal section and in a cross-section along the dashed line A.

The application relates to an apparatus for analyzing the chemical element composition, or element analysis for short, of materials by means of optical emission spectroscopy with means for exciting a plasma from a partial quantity of a test sample made of the material to be analyzed, means for detection and spectral evaluation of optical radiation emitted by the plasma, and beam guidance means for guiding at least a portion of the optical radiation emitted from the plasma to the means for detection and spectral evaluation. The application further relates to a method for element analysis of materials by means of optical emission spectroscopy using the apparatus.

In the known optical emission spectroscopy, also called chemical emission spectral analysis, through excitation of a plasma by electrical sparks or laser radiation, a small part, for example in the range of a few µg, of the material to be analyzed is excited for emitting radiation. Depending on the excitation type, the method is also called spark spectroscopy or laser-induced plasma spectroscopy (also called laser-induced breakdown spectroscopy, abbreviated as "LIBS").

The quantity of material is vaporized and atoms of the chemical elements contained are excited for emitting line radiation. This radiation is detected for each test sample as continuous spectra or subspectra in a spectrometer. In order to increase the measurement accuracy, an average is taken over a plurality of radiation events. The wavelength of the spectral lines is clearly assigned to the elements, so that a qualitative analysis is already possible from the spectra. The intensity of the spectral emission is a measure of the mass fraction of the element in the test sample and is used for chemical analysis of the constituents of the test sample. After calibration with reference samples of known composition, a quantitative chemical analysis is possible.

In "New approach to online monitoring of the Al depth profile of the hot-dip galvanized sheet steel using LIBS" by H. Balzer et al. in Anal. Bioanal. Chem. 385, 225-233 (2006), an embodiment of a conventional LIBS construction is described. For this purpose, a laser beam, which is generally pulsed, is directed to the sample to be analyzed and focused on it with a lens. If necessary, an autofocus system is used that measures the distance from the surface of the test sample and adjusts the focus depending on the measured distance. At the focus, a small quantity of material is ablated and a laser-induced plasma (LIBS plasma) is generated, the emitted radiation of which is coupled into an optical fiber (step-index fiber) with a light collecting unit consisting of a lens and guided to the spectrometer for the spectrally resolved measurement. The spectrometer can either measure in a time-integrating manner over one or more laser pulses or only in a time window shortly after the laser pulse or pulses, with so-called gating. The intensities of the element-specific spectral lines are used—after calibration—to determine the elemental contents.

The method requires sufficient spectral resolution. Spectrometers with solid-state detectors such as CCD or CMOS detectors come into consideration as compact spectrometers. Since the wavelength range of a spectrometer, given that it has sufficient spectral resolution, is limited, a plurality of spectrometers is required, depending on the application, to cover the necessary wavelength range.

In "Detection of Metals in the Environment Using a Portable Laser-Induced Breakdown Spectroscopy Instrument" by K. Y. Yamamoto et al. in Appl. Spectroscopy 50, 222-233 (1996), a LIBS construction for a portable device with a hand-guided measuring head is described. Therein, an optical fiber is brought with one end close to the radiation emitted by the plasma in order to collect the radiation directly without optical imaging and to transfer it to the spectrometer, which can then also be arranged further away.

The fiber end is covered with an interchangeable window made of quartz glass to protect it from contamination. However, there exists the problem that, with devices according to the current state of the art, some elements cannot be measured, or only with relatively great effort. One reason for this is that important emission spectrum lines of these elements lie at very short wavelengths in the so-called vacuum ultraviolet (VUV) wavelength region, with wavelengths below 200 nm.

In this wavelength region, the transmission through air and optical materials such as quartz glass, CaF2 or MgF2 decreases sharply, which reduces the sensitivity during a measurement. The transmission is critically dependent on the quality of the materials and the optical length. Transmission through longer optical fibers is generally too low, although for short lengths it can still be sufficient, depending on the quality and optical length.

The fall-off in transmission through air is mainly caused by the absorption of the radiation by the oxygen in the air and is still relatively low at the C-wavelength of 193 nm and at shorter optical path lengths, but increases strongly at shorter wavelengths.

The VUV wavelength region is important, for example, in the analysis of metals and in agricultural technology.

Particularly important emission lines for steel analysis are the lines, in the VUV region, of phosphorus (P) at 178 nm and sulfur (S) at 180 nm and of carbon (C) at 193 nm. Other elements with important spectral lines in this wavelength range are boron (B) at 182 nm and arsenic (As) at 189 nm. For these emission lines, there are practically no equivalent alternative lines in the longer-wave spectral region, since these spectral lines are either significantly less sensitive or are so heavily overlaid by other interfering elements that a usable analysis in the concentration range of interest is not possible.

There are also emission lines in the VUV regions in other matrices, such as aluminum.

Phosphorus plays an important role in agricultural technology, for example, in measuring the fertilization status of soils.

The element lines mentioned are in a wavelength region for which there still exist transmitting optical materials to a certain extent. For even shorter wavelengths, it is necessary to change over to mirror optics with corresponding surface requirements. The emission lines of nitrogen at 149 nm, oxygen at 130 nm and hydrogen at 121 nm are relevant in this regard.

In larger equipment for laboratory use, lines in the VUV region are measurable with corresponding effort using sample chambers and optical arrangements which cannot be compactly constructed. It is known to fill larger spectrometers for the VUV region with transparent gas, e.g. argon or nitrogen, or to design them as vacuum spectrometers. For stationary laboratory systems or even larger portable devices, gas-flushed sample stands or measuring chambers are used for making measurements. In the case of compact devices, this cannot be implemented in such a way due to the restrictions of structural space and the supply media, and some elements cannot be measured with devices according to the current state of the art.

It is therefore an object of the present invention to provide an apparatus and a method for the element analysis of materials by means of optical emission spectroscopy, with which the detection of emission lines in the VUV region is easily possible.

According to the invention, flushing with inert gas is carried out, wherein the beam guidance and the gas guidance are integrated into one element. For this purpose, at least one capillary tube is provided which assumes both functions. This enables a compact design and a reduction of the consumption of inert gas. The flushing of the capillary tube serving for beam guidance with inert gas, which preferably occurs from the side facing away from the test sample to the side facing toward the test sample, ensures a high transmission in the VUV region, favorable properties for the plasma excitation and the avoidance of contamination by removed material.

The formation of so-called dead spaces, which are not flushed by inert gas and in which residual oxygen is retained, which can cause the analysis to undergo uncontrolled fluctuations, is limited.

Due to their properties and for cost reasons, argon or nitrogen, in particular, can be used as the inert gas, whereby argon is generally more favorable for plasma excitation and has higher intensities of the emission lines.

According to a preferred embodiment of the invention, the capillary tube also serves as a light collecting unit. A part of the radiation emitted from the plasma intended for analysis thus enters the capillary tube directly without the interposition of a further optical element. For this purpose, its end facing the test sample is arranged at a distance from the plasma, which is preferably between 1 mm and 15 mm. The omission of an optical element for coupling radiation emitted from the plasma into the beam guidance means has the advantage that the capillary tube can be brought close to the plasma without the risk of an impairment of the measurement due to contamination of an optical element. In addition, the lens imaging of the plasma radiation shows a strong increase in chromatic errors, particularly at short wavelengths, so that the imaging is strongly dependent on the wavelength. This problem is avoided by dispensing with a lens.

The length of the capillary tube is preferably in the range of 5 mm to 200 mm. A suitable inner diameter of the capillary tube is in the range of 0.01 mm to 3 mm, preferably in the range of 0.2 mm to 1 mm. The capillary tube is advantageously designed as a glass capillary with a smooth inner surface. However, other embodiments, such as, for example, thin capillaries that are mirrored internally, are also conceivable. The capillary tube can be designed straight or curved.

The means for detection and spectral evaluation of optical radiation emitted from the plasma preferably comprise at least one spectrometer, wherein at least one separate capillary tube is allocated to each spectrometer. By this means, the position of each capillary tube can be optimized with respect to the associated spectrometer.

According to a preferred embodiment of the invention, the capillary tube is directly coupled to the spectrometer by means of a holder. Thus, optical material along the propagation path of radiation from the plasma to the spectrometer is completely omitted, so that no transmission fall-off caused by optical materials occurs in the VUV region. In addition, it is advantageous that in this case only radiation from a constant partial region of the emitting plasma is guided to the spectrometer without optical imaging.

According to an alternative preferred embodiment of the invention, the capillary tube is coupled to the spectrometer by means of a holder containing a further optical element.

According to other alternative preferred embodiments of the invention, the capillary tube is coupled either directly or via a further optical element to an optical fiber connected to the spectrometer by means of a holder. The fiber is preferably a step-index fiber. The use of a fiber has the advantage that the arrangement of the spectrometer can be made more flexibly, since a fiber can be curved more strongly than a capillary tube.

According to a further preferred embodiment of the invention, a plurality of capillary tubes placed adjacent to one another in a close arrangement is allocated to at least one spectrometer in order to increase the intensity of the detected optical radiation.

According to another preferred embodiment of the invention, at least one capillary tube is arranged in such a way that optical radiation emitted from the plasma is detected at a shallow angle, preferably an angle of 1° to 20°. This is the angle between the direction of the emitted optical radiation and the surface of the test sample. This has the advantage that spectral lines serving for the analysis can be better observed, since these spectral lines in the exterior area of the plasma are not so heavily covered by other spectral lines. When analyzing steel, for example, many Fe lines occur that are particularly strong in the center of the plasma and there cover the spectral lines used for the analysis.

The advantages of the invention are particularly useful in a hand-guided device, in which a compact design is required. In addition, hand-guided devices must be able to operate with a limited gas supply. A gas flushing of a larger measurement chamber volume with a high gas flow rate, as in larger laboratory equipment, is practically impossible due to lack of space and the high gas consumption. Therefore, the economical gas consumption resulting from flushing the capillary tube with inert gas is of particular importance herein.

The preferred embodiments and advantages described in connection with the apparatus according to the invention also apply, where usable, to the method according to the invention.

Further advantages, features and details of the invention are shown in the following description of preferred exemplary embodiments and by reference to the drawings.

FIG. 1 shows a first example for the schematic design of an apparatus according to the present invention. In the case of a laser-excited plasma, the apparatus comprises a laser beam source 1 for emitting laser radiation 4 and generating a plasma 9, an imaging optical system 5 for focusing the laser radiation 4 onto a test sample 7, for example, a sample of a material to be analyzed, as well as one or more spectrometers 2a, 2b for analyzing radiation 14a emitted from the plasma 9, and a supply and control unit 3. The supply and control unit 3 is constructed according to the known prior art and contains battery, control, electronics, evaluating electronics, computers for data processing, gas containers, laser control, spectrometer control, triggering, gas control and, if relevant, autofocusing. The LIBS plasma 9 generated has an extent 21 in the z-direction. The corresponding coordinate system 23 with origin 22 in the intersection point of laser beam axis 6 and test sample surface 8 is shown in FIG. 1.

Figure 2:
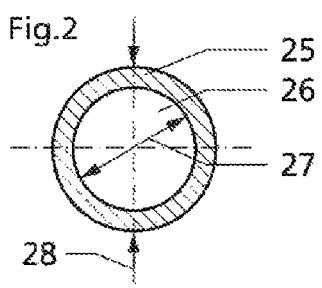
FIG. 2 is a cross-section along the dashed line B of FIG. 1 through a capillary tube according to the invention.

Associated with each spectrometer 2a, 2b is a capillary tube 10a, 10b, which receives a part of the radiation emitted from the plasma 9 and feeds it to the respective spectrometer 2a, 2b. The capillary tube 10a is arranged at an angle 20a to the surface 8 of the test sample 7 such that the object-side end 19a of the capillary tube 10a is arranged at the coordinates [x(19a); y(19a); z(19a)] at a distance of approximately 1 to 15 mm from the radiation-emitting region which, in this case, is a laser-induced plasma 9 and is directed thereto or to subregions thereof. A cross-section through a capillary tube is shown in FIG. 2 with the tube wall 25, the hollow inner region 26, the inner diameter 27 and the outer diameter 28. The length of the capillary tubes is advantageously in the range of 5 to 200 mm.

The capillary tube 10a is fastened to an input 18a of the spectrometer 2a by means of a holder 16a. The holder has an inlet for a gas 17a through which the capillary tube 10a can be flushed in the direction of the test sample. In the embodiment in FIG. 1, the coupling of the capillary tube 10a occurs directly to the spectrometer 2a without a transmitting optical system in the entire beam guidance region.

It thus has the advantage that there are therefore no limitations in the transmission. Another advantage with regard to the spectral analysis is that only radiation 14a from a constant partial region of the emitting plasma 9 is fed to the spectrometer 2a without optical imaging. The same applies to the capillary tube 10b.

On the object side, the capillary tube 10a is fastened in a measurement chamber 11. The measurement chamber 11 is placed on the test sample 7 for measurement. As in conventional arrangements, it is equipped with a gas inlet 12 and a gas outlet 13, so that the interior is additionally flushed with a gas, which serves both to protect the imaging optical system 5 and further increases the purity of the gas atmosphere. The measurement chamber 11 also serves as radiation protection against the emitted laser radiation. The use of the capillary tube 10a additionally has the advantage that, if necessary, additional spectrometers can be added in a simple manner to expand the spectral range. The capillary tube 10b associated with the spectrometer 2b can be coupled with an angle offset 24, as shown in the view A in FIG. 1. The object-side end 19b (not shown in FIG. 1) can be mounted in the position optimized for the spectral range of the spectrometer 2b with the coordinates [x(19b); y(19b); z(19b)]. This separate optimization is not possible with conventional arrangements in such a compact manner or is fundamentally precluded if the distribution to a plurality of spectrometers is conventionally carried out with a fiber bundle. Similarly, the arrangement can be expanded by additional spectrometers.

For analysis, it can be advantageous to reduce the angle 20a such that a lateral observation occurs at a flat angle in the range of about 1° to 20° and only a subregion of the emitting region is detected. If the arrangement of the spectrometer laterally is possible, a straight capillary tube 10a can continue to be used. The advantage of the proposed arrangement is that, compared to conventional optical systems, very flat angles are possible.

In order to carry out the method according to the invention, the laser radiation 4 emitted by the laser beam source 1 is focused on the test sample 7 by the imaging optical system 5 along the laser beam axis 6. The focus is adjusted to the test sample surface 8 or very close to it.

Changes in the distance from the imaging optical system 5 to the test sample surface can lead to a change in the laser intensity at the focus and thus to changes in the measurement signals if the depth of focus of the laser focusing is too low. Therefore, if necessary, an automatic focus setting as known from "New approach to online monitoring of the Al depth profile of the hot-dip galvanized sheet steel using LIBS" by H. Balzer et al., Anal. Bioanal. Chem. 385, 225-233 (2006), may be required in order to keep the distance as constant as possible. For this purpose, the distance from the imaging optical system 5 to the test sample surface is measured and, in the case of deviations from the target position, the distance is regulated to a constant value, for example, by tracking the z-position of the imaging optical system 5 with respect to the test sample surface.

The detection of a portion of the emitted plasma radiation 14a occurs with the spectrometer 2a, which is designed in such a way that it covers the VUV wavelength region. The portion of the emitted radiation 14a impinging upon the cross-section of the capillary tube 10a is guided either directly or via reflection on the capillary tube wall to the spectrometer input 18a. Due to the grazing incidence and the design of the capillary tubes with a smooth inner surface, the degree of reflection on the capillary tube wall is very high. Since no optical material is present along the propagation path, the corresponding transmission drop in the VUV region no longer occurs. A gas stream 17a is introduced into the capillary tube 10a through the gas inlet in the holder 16a, and exits at the object-side end 19a of the capillary tube 10a and flushes the path to the radiation-emitting plasma. The plasma beam guidance takes place in almost complete coincidence with the very pure gas stream in the capillary tube 10a and from the object-side end 19a to the radiation-emitting region 9. This results in a very pure gas atmosphere without dead spaces for the analysis, ensuring high VUV transmission. The gas stream 15a exiting the capillary tube 10a transports material removed from the test sample in an ideal manner away from the optical detection. In addition, it prevents the penetration and deposition of contaminants onto the inner wall of the capillary tube 10a, so that the object-side end 19a can be guided relatively close to the radiation-emitting region 9 and the radiation coupling can be increased.

The detection optical system is thereby kept free of contamination and a constant transmission is guaranteed, in a way that is hardly possible with a conventional arrangement.

The compact dimensions of the arrangement compared with conventional imaging optical systems and gas guidance are generally advantageous, since they enable an integrated VUV-compatible radiation and gas guidance with reduced gas consumption and reduced dead spaces. Limitations in the wavelength range due to transmitting optical materials and due to air absorption are omitted or significantly reduced. It offers a decisive advantage when used in compact, so-called handheld LIBS devices, abbreviated HHL devices, with corresponding installation space and gas consumption restrictions.

The requirements for the gas flushing 12, 13 of the measurement chamber 11 with regard to the gas throughput and avoidance of dead spaces are also significantly reduced by the capillary tube flow, which almost completely covers the decisive path of the radiation emission to the spectrometer.

Depending on the laser parameters, test sample and aims of the analysis with regard to the accuracy requirements, measurement time and the quality of the test sample, such as homogeneity of the composition, contamination of the surface or cover layers that are not to be analyzed, the measurement can be carried out at one or at several positions of the test sample. At one position, a typical measuring sequence on steel consists, for example, of a number of prepulses $N_{VP}$, e.g. $N_{VP}=20$, for cleaning the measuring object surface and a number of subsequent measuring pulses, $N_{MP}=50$ to 1000, with recording of the measuring signals, see for example Sturm et al., "Steel Analysis with Laser-Induced Breakdown Spectrometry in the Vacuum Ultraviolet", Appl. Spectroscopy 54, 1275-1278 (2000), page 1277. As is known to a person skilled in the art, the recording of the measurement signals can take place time-integrated via one or more of the laser pulses or in short time windows after one or after a plurality of the laser pulses. In addition, in most applications an average over the number of measuring pulses is determined. In order to increase further the measurement accuracy or in the case of inhomogeneous test samples, the measurement can be carried out at a plurality of test sample positions. For this purpose, the test sample 7 and the laser beam axis 6 are offset against each other and the measurement is repeated at the new test sample positions.

This is done on a plurality of, for example, three to five test sample positions and the results are averaged.

Figure 3:
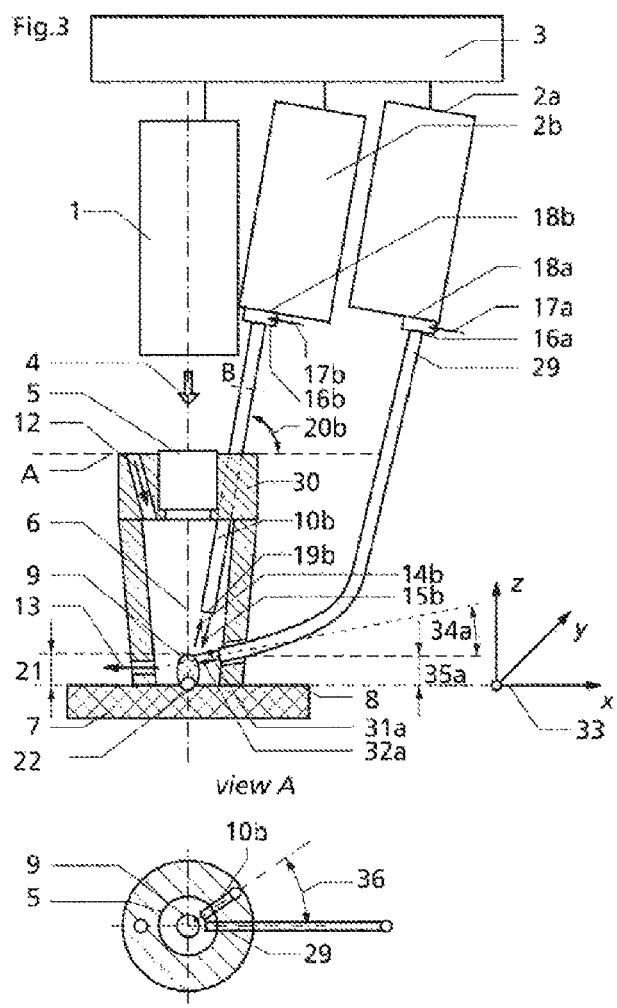
FIG. 3 is an apparatus according to a further exemplary embodiment of the invention in a longitudinal section and in a cross-section along the dashed line A.

FIG. 3 shows a further exemplary embodiment of an apparatus according to the present invention with one or two spectrometers 2a, 2b in the event that a lateral observation by the spectrometer 2a of the radiation emitted from the plasma 9 is desired, but that a lateral arrangement of the spectrometer 2a is not possible. For this purpose, the apparatus has a curved capillary tube 29, which is allocated to the spectrometer 2a and is attached to an input 18a of the spectrometer 2a with a holder 16a. Since the transmission of the capillary tube 29 falls with the curvature, the curvature must not be too severe. The object-side end of the capillary tube 29 is arranged at an angle 34a of approximately 1° to 20° and at a distance 35a from the test sample surface 8. At the spectrometer holder 16a, the gas 17a flows in and generates a gas stream 32a to the emitting region 9 at the end of the capillary tube 29. The capillary tube 29 receives the emitted radiation 31a and leads in a curved path to the spectrometer 2a. A further spectrometer 2b can be coupled as in FIG. 1 by arranging a capillary tube 10b associated with said spectrometer at an angular offset 36.

Figure 4:
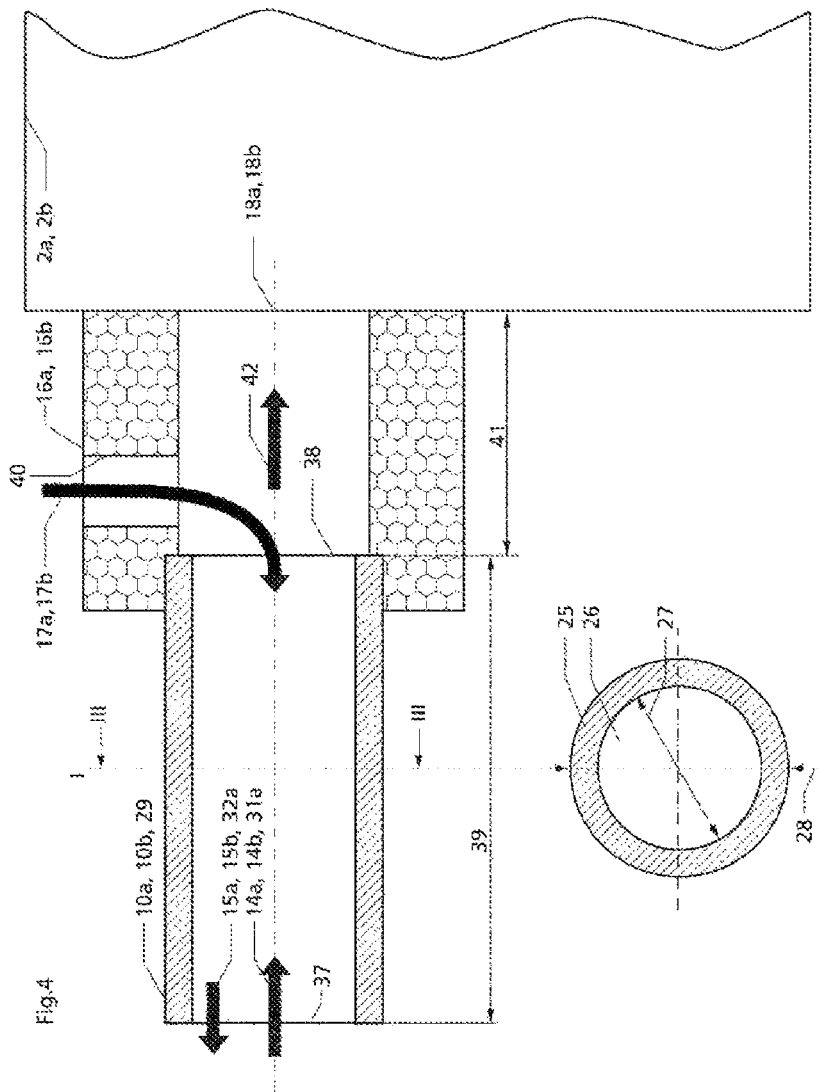
FIG. 4 is a detailed view of the coupling of a capillary tube to a spectrometer according to an exemplary embodiment of the invention in a longitudinal section and in a cross-section along the dash-dotted line I in the direction of the arrow III.

FIG. 4 shows the coupling of a capillary tube 10a, 10b or 29 of the length 39 to the respective spectrometer 2a or 2b in one embodiment. Mounted at the input of the spectrometer 2a, 2b is the holder 16a, 16b which receives the spectrometer-side end 38 of the capillary tube 10a, 10b, 29 and positions it at a distance 41. Through a lateral gas connection 40, the gas 17a, 17b enters the capillary tube at the cross-section 38 and flows out at the cross-section 37 on the object side as the gas stream 15a, 15b, 32a. The radiation 42 emerging from the capillary tube 10a, 10b or 29 is incident directly upon the input 18a, 18b of the spectrometer 2a, 2b.

Figure 5:
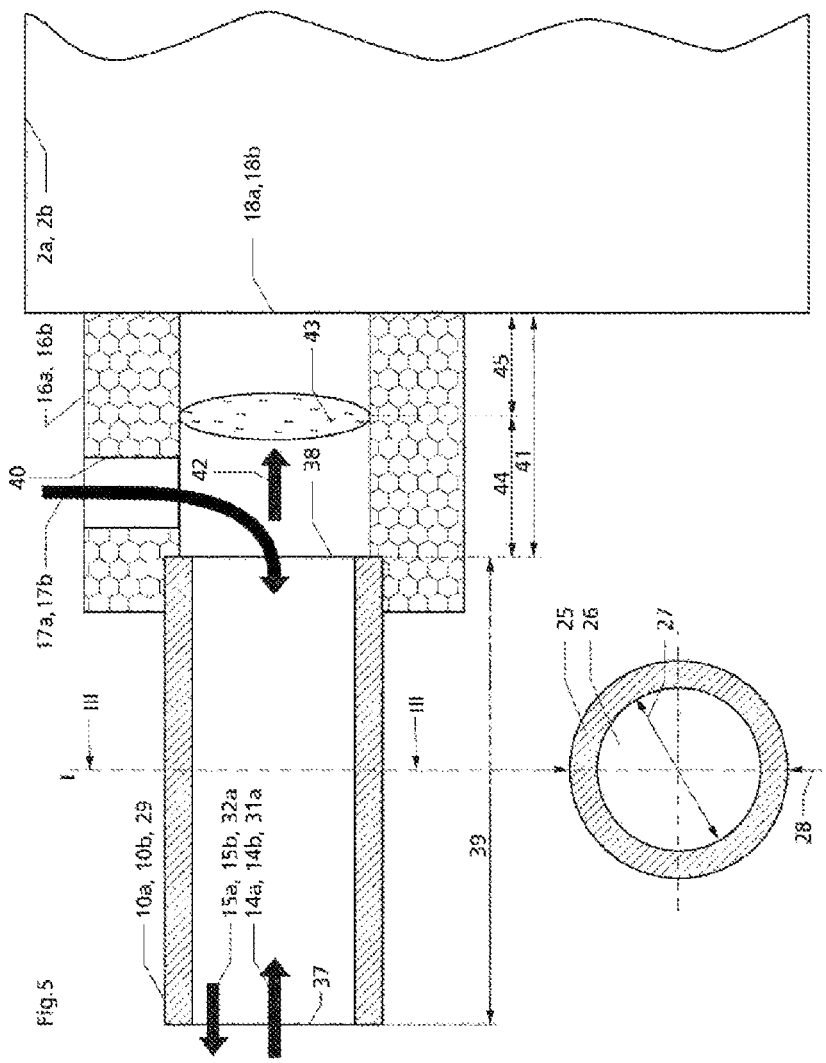
FIG. 5 is a detailed view of the coupling of a capillary tube to a spectrometer according to a further exemplary embodiment of the invention in a longitudinal section and in a cross-section along the dash-dotted line I in the direction of the arrow III.

FIG. 5 shows an alternative embodiment of the coupling of a capillary tube 10a, 10b or 29 of the length 39 to the respective spectrometer 2a or 2b. Here, a lens 43 is additionally inserted at a distance 44 from the capillary tube end 38 and at a distance 45 from the spectrometer input 18a, 18b, by means of which the radiation 42 exiting from the spectrometer-side end 38 of the capillary tube 10a, 10b, or 29 is imaged onto the spectrometer input 18a, 18b.

When the reduction of transmission through the lens 43 is only minor, this embodiment can be advantageous to increase the intensity of the radiation detected by the spectrometer. In contrast to a direct lens image without a capillary tube, only the spectrometer-side end 38 of the capillary tube 10a, 10b, 29 is imaged by the lens and thus only the radiation detected by the object-side end 37 of the capillary tube 10a, 10b, 29 from a constant partial region of the emitting plasma is coupled into the spectrometer.

Figure 6:
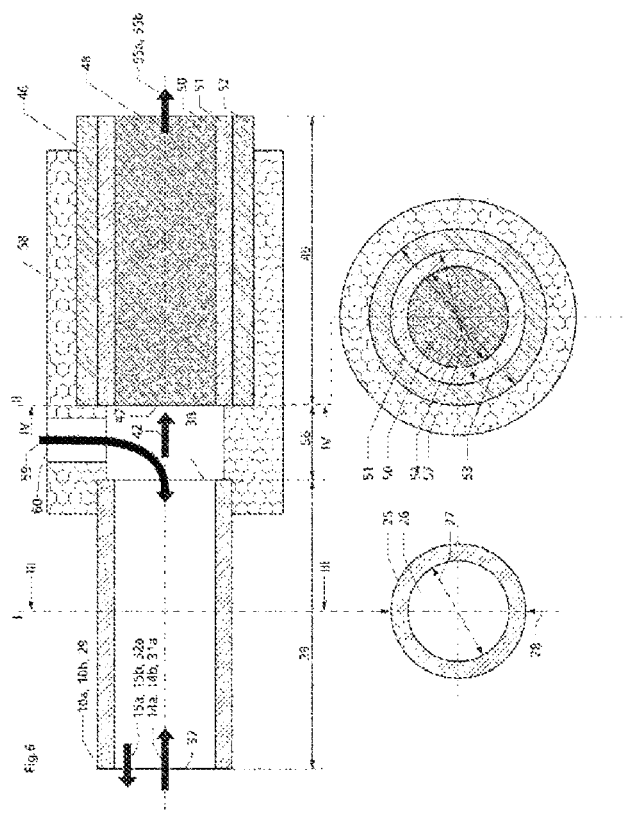
FIG. 6 is a detailed view of the coupling of a capillary tube to a step-index fiber according to a further exemplary embodiment of the invention in a longitudinal section and in a cross-section along the dash-dotted line I in the direction of the arrows III, and in a cross-section along the dash-dotted line II in the direction of the arrows IV.

FIG. 6 shows an embodiment in which a capillary tube 10a, 10b, 29 is connected to a short step-index fiber 46 of the length 49 by direct coupling at a distance 56. The step-index fiber has a core 50 having a diameter 57, a jacket 51 having a diameter 54, and an outer shell made of an inert coating 52 having a diameter 53. Similar to the embodiments shown in FIGS. 4 and 5, a lateral gas connection 60 is provided in a holder 58 through which a gas stream 59 enters. The step-index fiber 46 is connected with one end 48 in a conventional manner to a spectrometer. The transmission of an optical fiber 46 can be sufficient if short optical path lengths are provided and the spectrometer has sufficiently high sensitivity. This applies to lengths 49 of high-quality UV fibers 46, for example made of high-purity quartz glass, for example, in the range 5 to 15 cm and at wavelengths up to approximately 178 nm for P. The advantage herein is that a step-index fiber 46 can be curved more strongly, so that the coupling of a straight capillary tube 10a, 10b at a flat angle is possible, and the curvature to a spectrometer situated at the rear, as in the exemplary embodiment of FIG. 3, is made possible by the step-index fiber 46. Another advantage is that the adjustment of the capillary tube is less dependent on the spectrometer adjustment.

Figure 7:
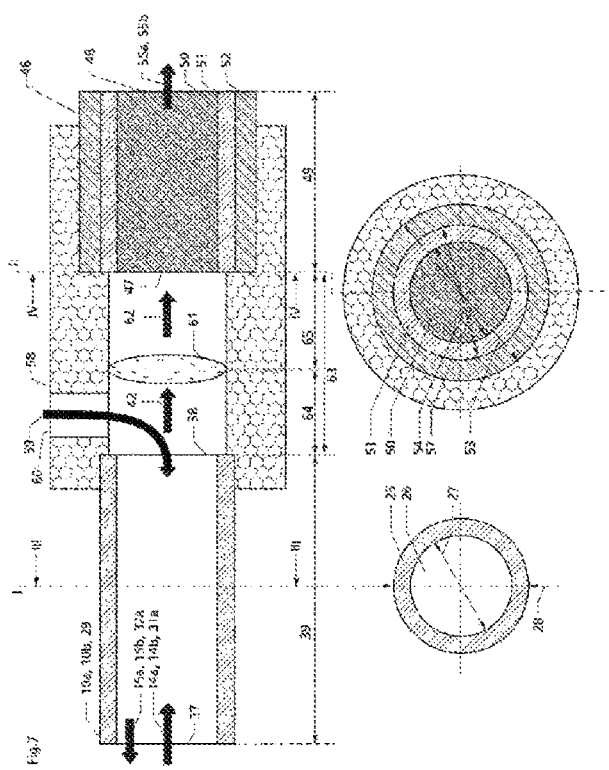
FIG. 7 is a detailed view of the coupling of a capillary tube to a step-index fiber according to a further exemplary embodiment of the invention in a longitudinal section as well as in a cross-section along the dash-dotted line I in the direction of the arrows III, and in a cross-section along the dash-dotted line II in the direction of the arrows IV.

FIG. 7 shows a further embodiment of the fiber coupling, wherein, in contrast to the embodiment shown in FIG. 6, a lens 61 is additionally utilized, at a distance 64 from the capillary tube end 38 and at a distance 65 from the end 47 of the step-index fiber 46.

Figure 8:
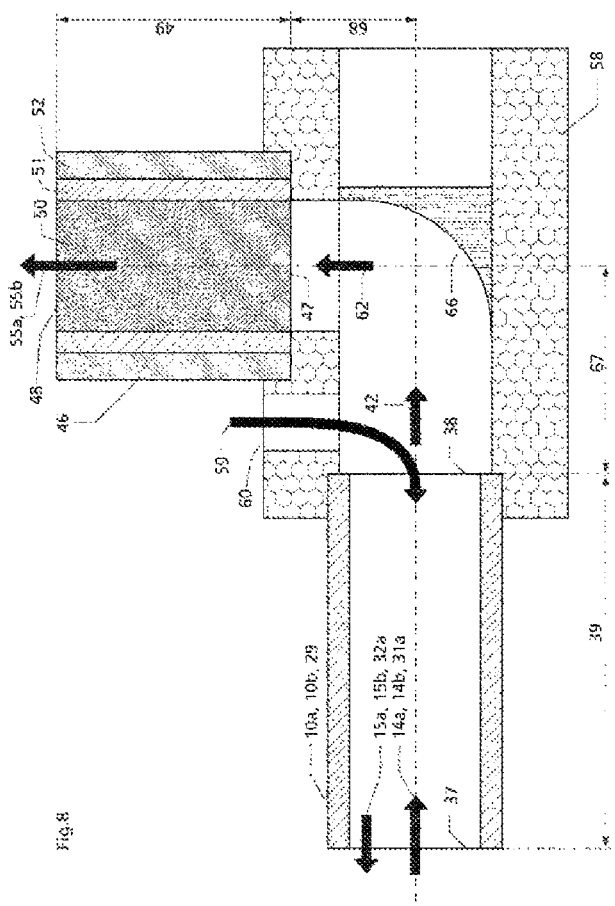
FIG. 8 is a detailed view of the coupling of a capillary tube to a step-index fiber according to another exemplary embodiment of the invention in a longitudinal section.

Another embodiment of the fiber coupling is shown in FIG. 8. In this embodiment, in contrast to the embodiment shown in FIG. 6, a mirror 66 is additionally arranged between the capillary tube end 38 and the end 47 of the step-index fiber 46. This results in a 90° deflection of the radiation, so that this embodiment is advantageous for the use of the capillary tube 10a, 10b, 29 at a flat angle, if the spectrometer cannot be mounted laterally. In place of the step-index fiber 46 in FIG. 8, a capillary tube can also be used at this point if the transmission of the fiber is not sufficient.

Figure 9:
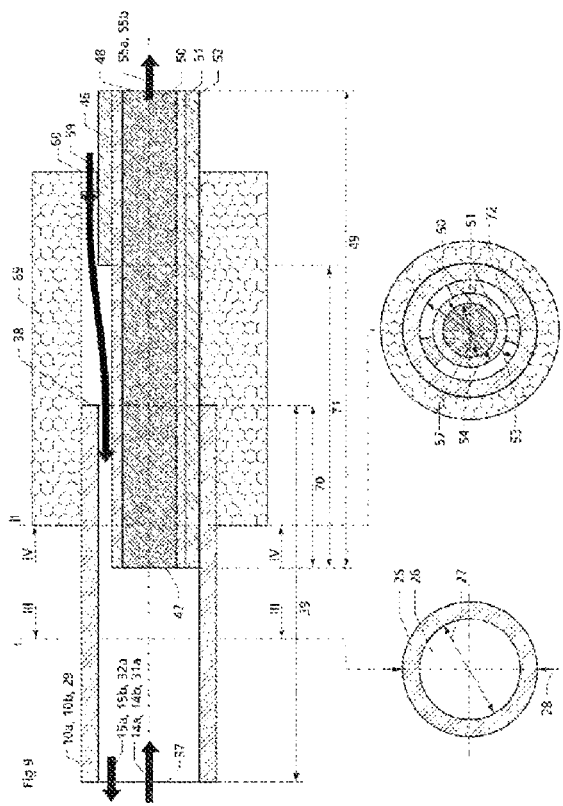
FIG. 9 is a detailed view of the coupling of a capillary tube to a step-index fiber according to a further exemplary embodiment of the invention in a longitudinal section and in a cross-section along the dash-dotted line I in the direction of the arrows III, and in a cross-section along the dash-dotted line II in the direction of the arrows IV.

FIG. 9 shows a further alternative to the embodiment shown in FIG. 6. In place of a lateral gas connection in the holder connecting the capillary tube to the fiber, as shown in FIG. 6, the step-index fiber 46 comprises here, in a section 71 facing the capillary tube, exposed areas 72 in its outer shell 52, through which gas can flow in. In the embodiment shown in FIG. 9, the section 71 is inserted up to a length 70 into the end of the capillary tube facing the fiber 46. This embodiment is advantageous with respect to the simple assembly and intrinsic adjustment of the coupled fiber.

Figure 10:
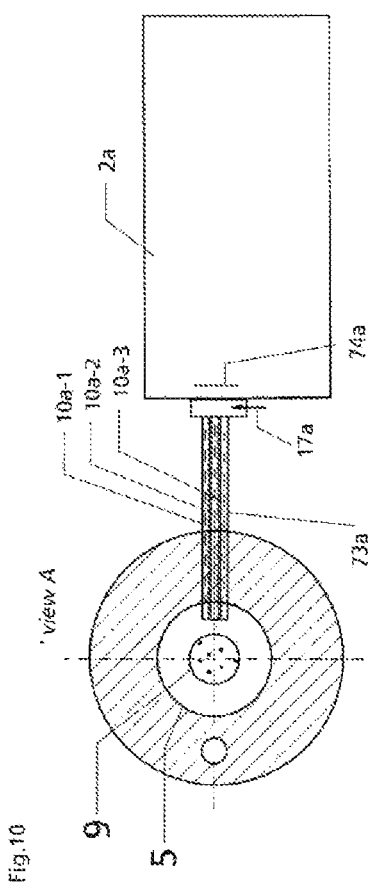
FIG. 10 is an apparatus according to a further exemplary embodiment of the invention in a sectional view.

FIG. 10 shows a schematic view of an apparatus according to a further exemplary embodiment of the present invention. The intensity of the detected radiation emission can be increased if a plurality of capillary tubes 10a-1, 10a-2, 10a-3 are placed adjacent to one another in a close arrangement 73a and along an inlet gap 74a of the spectrometer 2a.

Figures 11, 12:
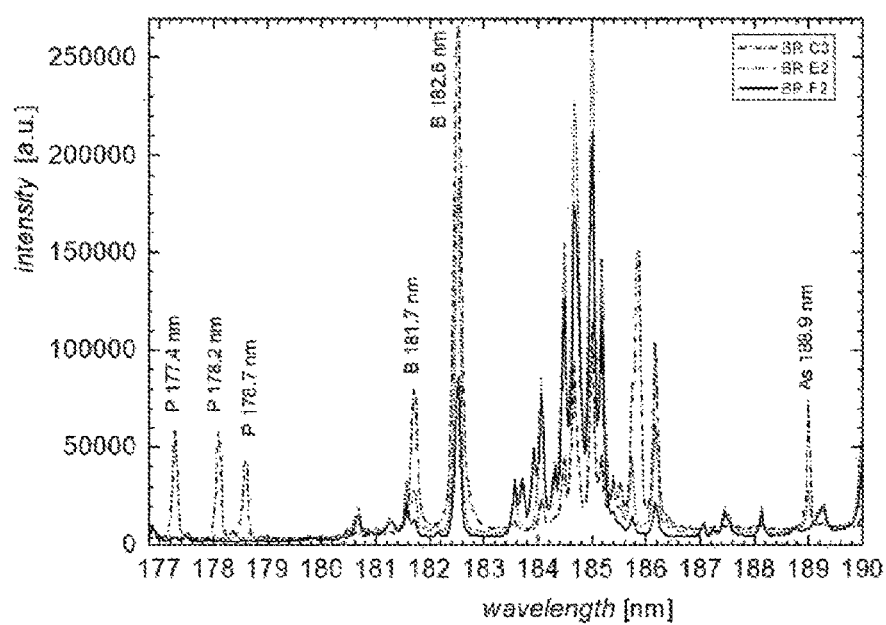
FIG. 11 is a graphical representation of emission spectra measured from silicate glass samples as test samples according to the exemplary embodiment of FIG. 1.
FIG. 12 is a table of mass fractions of the silicate glass samples.
Figure 13:
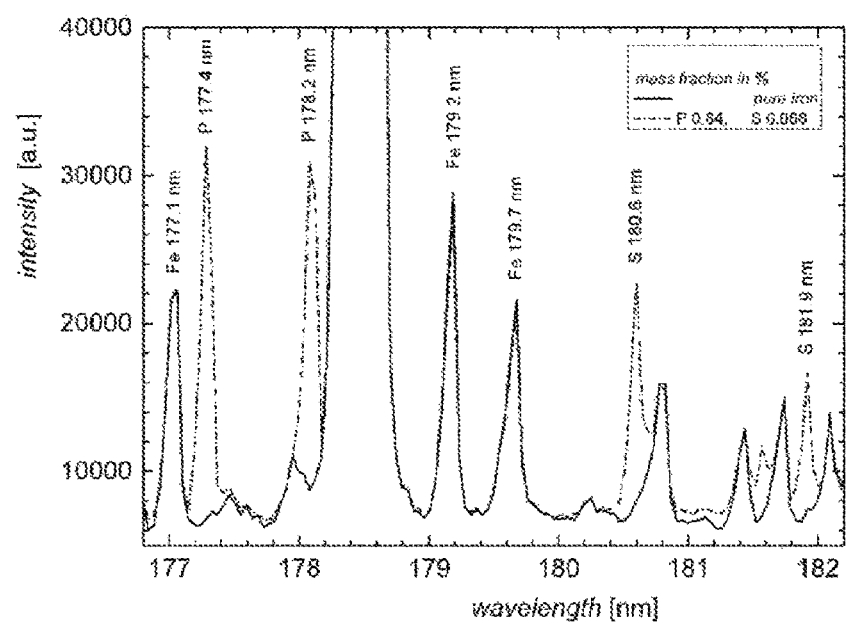
FIG. 13 is a graphical representation of emission spectra measured from steel according to the exemplary embodiment of FIG. 1.

First experiments have shown that with the embodiment according to FIG. 1, spectra can be detected in the VUV region and used for a chemical emission spectral analysis. Spectral lines for P, B and As are clearly visible for the silicate glass samples BR-C3, BR-E2 and BR-F2 used as the test sample, as shown in FIG. 11. The spectral lines are labeled in the spectra in FIG. 11 with their emission wavelengths. Their intensity increases with increasing mass fraction, as shown in FIG. 12. Also for measurement using steel samples as the test samples, FIG. 13 shows, for a pure iron sample (continuous line) and a sample with 0.84% P and 0.068% S (dash-dotted line), that the spectral lines of P and S are clearly detected in the VUV region.

A capillary tube with an inner diameter of 0.45 mm and a length of 50 mm was used for all the measurements.

The above-described exemplary embodiments of the invention all relate to apparatuses for LIBS measurement that use laser radiation to generate a plasma. However, the invention is also applicable to devices in which the plasma is generated by spark excitation. In this case, the laser beam source 1, the emitted laser radiation 4, the imaging optical system 5 and the laser beam axis 6 are omitted. In the case of spark excitation, only electrically conductive test samples are measurable, since the test sample acts as an electrode. A further electrode is arranged opposite it, to which a sufficiently high electrical potential is applied during operation, and thereby a plasma 9 is generated. The control unit contains the supply and control elements required for the operation of a spark excitation in place of the laser control. The basic technique of spark excitation is sufficiently well known to a person skilled in the art. The description of the radiation and gas guidance by means of capillary tube described above can be used in this case equally as advantageously as in the case of laser-excited plasma.

The invention claimed is:

1. An apparatus for element analysis of materials by means of laser-induced plasma spectroscopy, comprising:
   a means for exciting a plasma from a partial quantity of a test sample made of a material to be analyzed;
   a means for detection and spectral evaluation of optical radiation emitted from the plasma; and
   a beam guidance means for guiding at least a portion of the optical radiation emitted from the plasma to the means for detection and spectral evaluation; and
   a means for flushing at least a portion of the apparatus with an inert gas;
   wherein the beam guidance means comprises at least one capillary tube, which also serves to guide the inert gas, and is arranged such that optical radiation emitted from the plasma is detected at a flat angle of 1° to 20°.

2. The apparatus according to claim 1, wherein the capillary tube also serves as a light collecting unit and its end facing the test sample is arranged, without interposition of a further optical element, at a distance from the plasma, which is preferably between 1 mm and 15 mm.

3. The apparatus according to claim 1, wherein the capillary tube has an inner diameter from a range of 0.01 mm to 3 mm, preferably from a range of 0.2 mm to 1 mm, and/or the capillary tube has a length from a range of 5 mm to 200 mm.

4. The apparatus according to claim 1, wherein the means for detection and spectral evaluation of optical radiation emitted from the plasma comprises at least one spectrometer, wherein at least one dedicated capillary tube is allocated to each spectrometer.

5. The apparatus according to claim 4, wherein the capillary tube is coupled directly to the spectrometer by means of a holder.

6. The apparatus according to claim 4, wherein the capillary tube is coupled to the spectrometer by means of a holder containing a further optical element.

7. The apparatus according to claim 4, wherein the capillary tube is coupled by means of a holder directly to a fiber which is connected to the spectrometer.

8. The apparatus according to claim 4, wherein the capillary tube is coupled by means of a holder containing a further optical element to a fiber which is connected to the spectrometer.

9. The apparatus according to claim 5, wherein the holder has a lateral gas connection for introducing the inert gas into a spectrometer-side end of the capillary tube.

10. The apparatus according to claim 7, wherein a part of an outer shell of the fiber is open to allow an introduction of the inert gas into a spectrometer-side end of the capillary tube.

11. The apparatus according to claim 4, wherein a plurality of capillary tubes placed adjacent to one another in a close arrangement are allocated to at least one spectrometer in order to increase an intensity of the detected optical radiation.

12. The apparatus according to claim 1, wherein the apparatus is a hand-guided apparatus.

13. The apparatus according to claim 1, wherein the apparatus is configured to detect optical radiation with wavelengths below 200 nm.

14. A method for element analysis of materials by laser-induced plasma spectroscopy, comprising:
   exciting a plasma from a partial quantity of a test sample made of a material to be analyzed;
   conducting at least a portion of an optical radiation emitted from the plasma to a means provided for detection and spectral evaluation of the optical radiation;
   performing detection and spectral evaluation of the conducted optical radiation;
   supplying an inert gas by means of a capillary tube; and
   conducting the at least a portion of the optical radiation by means of the capillary tube wherein the capillary tube is arranged such that optical radiation emitted from the plasma is detected at a flat angle of 1° to 20°.

15. The method according to claim 14, wherein the capillary tube also serves as a light collecting unit.

16. The method according to claim 14, wherein the inert gas is fed into the capillary tube at its end facing away from the test sample.

17. The method according to claim 16, wherein the method is configured for an optical radiation with wavelengths below 200 nm.

18. The apparatus according to claim 8, wherein a part of an outer sheath of the fiber is exposed in order to enable the inert gas to be introduced into a spectrometer-side end of the capillary tube.

19. An apparatus for element analysis of materials by laser-induced plasma spectroscopy, comprising:
   a means for exciting a plasma from a partial quantity of a test sample made of a material to be analyzed;
   at least one spectrometer for detection and spectral evaluation of an optical radiation from the plasma;
   at least one capillary tube configured to guide at least part of the optical radiation from the plasma to the at least one spectrometer; and
   a means for purging at least a portion of the apparatus with an inert gas;
   wherein the at least one capillary tube is configured to guide the inert gas and is disposed so that optical radiation is detected which emanates from the plasma at a low angle between 1° to 20°.

* * * * *